(12) United States Patent
Huebner et al.

(10) Patent No.: US 9,679,359 B2
(45) Date of Patent: Jun. 13, 2017

(54) VEHICLE SURROUND VIEW SYSTEM

(75) Inventors: Klaus Huebner, Pforzheim (DE); Koba Natroshvili, Waldbronn (DE); Johannes Quast, Karlsruhe (DE); Kay-Ulrich Scholl, Karlsbad (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 428 days.

(21) Appl. No.: 13/446,613

(22) Filed: Apr. 13, 2012

(65) Prior Publication Data

US 2012/0262580 A1     Oct. 18, 2012

(30) Foreign Application Priority Data

Apr. 14, 2011   (EP) .................................. 11162470

(51) Int. Cl.
  *H04N 7/18*     (2006.01)
  *G06T 3/40*     (2006.01)
  (Continued)

(52) U.S. Cl.
  CPC .............. *G06T 3/4038* (2013.01); *B60R 1/00* (2013.01); *G06K 9/00791* (2013.01);
  (Continued)

(58) Field of Classification Search
  CPC .......... H04N 7/18; H04N 5/232; H04N 5/235; H04N 7/181; H04N 5/228; H04N 13/0239; H04N 13/0422; H04N 13/0257; H04N 9/47; H04N 5/2624; H04N 5/247; H04N 5/23293; H04N 5/23296; H04N 5/272; G09B 19/00; G06K 9/00; G06K 9/36; G06K 9/32; G06K 9/00791; G08G 1/16; G08G 1/14; G08G 1/167; G08G 1/168;
  (Continued)

(56) References Cited

U.S. PATENT DOCUMENTS 7,161,616 B1 * 1/2007 Okamoto .................. B60R 1/00
                                                     348/148
7,266,219 B2 * 9/2007 Okamoto .................. B60R 1/00
                                                     340/901
(Continued)

FOREIGN PATENT DOCUMENTS

EP     1115250 A1    7/2001
EP   1 302 365 A1    4/2003
(Continued)

OTHER PUBLICATIONS

European Search Report for European Patent Application No. 11 003 828.8, 8 pgs., Sep. 22, 2011.
(Continued)

*Primary Examiner* — Dramos I Kalapodas
(74) *Attorney, Agent, or Firm* — McCoy Russell LLP

(57) ABSTRACT

A surround view system that can provide a surround view, e.g., a 360° view, from a vehicle by way of cameras positioned at various locations on the vehicle. The cameras can generate image data corresponding to the surround view, and a processing device can process the image data and generate the surround view on a simulated predetermined shape that can be viewed from a display. The simulated predetermined shape can have a flat bottom with a rectangular shape and a rim with a parabolic shape.

16 Claims, 6 Drawing Sheets

(51) Int. Cl.
  *B60R 1/00* (2006.01)
  *G06K 9/00* (2006.01)
  *G08G 1/16* (2006.01)
(52) U.S. Cl.
  CPC ............ *G08G 1/166* (2013.01); *G08G 1/167* (2013.01); *G08G 1/168* (2013.01); *B60R 2300/306* (2013.01); *B60R 2300/602* (2013.01); *B60R 2300/607* (2013.01)
(58) Field of Classification Search
  CPC .... G08G 1/166; B60R 1/00; B60R 2300/105; B60R 11/04; B60R 2300/802; B60R 2300/70; B60R 2300/602; B60R 2300/607; B60R 2300/306; B60R 2300/304; B60R 2300/103; B60R 2300/60; B60R 2300/80; G06T 15/205; G06T 3/60; G06T 19/006; G06T 3/4038; G06T 7/85; G06T 7/002; G06T 2207/30252; G06T 2207/30208; G06T 5/006; G06T 19/00; G06T 2215/12; G06T 15/20; B60K 35/00; B60K 37/02; B60K 2350/1024; B60K 37/06; B60K 2350/901; B60K 2350/1028; G01D 11/28; B60Q 1/00; B06Q 1/48; G01C 21/3664; G06F 3/0488
  USPC ............ 348/148; 340/995.14, 905; 434/219; 382/284
  See application file for complete search history.

(56) References Cited

U.S. PATENT DOCUMENTS

| | | | | |
|---|---|---|---|---|
| 7,307,655 | B1* | 12/2007 | Okamoto | G06K 9/00791 348/222.1 |
| 8,078,359 | B2* | 12/2011 | Small | B60K 35/00 701/1 |
| 8,319,618 | B2* | 11/2012 | Gomi et al. | 340/435 |
| 8,576,285 | B2* | 11/2013 | Gomi et al. | 348/148 |
| 8,670,034 | B2* | 3/2014 | Hattori | B60R 1/00 345/620 |
| 8,749,632 | B2* | 6/2014 | Yamada | B60Q 1/04 340/435 |
| 2001/0010555 | A1* | 8/2001 | Driscoll, Jr. | 348/335 |
| 2002/0027651 | A1 | 3/2002 | Jackson et al. | |
| 2003/0021490 | A1* | 1/2003 | Okamoto et al. | 382/284 |
| 2007/0041659 | A1* | 2/2007 | Nobori et al. | 382/284 |
| 2008/0231702 | A1* | 9/2008 | Matsumoto | B60R 1/00 348/148 |
| 2008/0231710 | A1 | 9/2008 | Asari et al. | |
| 2009/0042173 | A1* | 2/2009 | Jaszlics et al. | 434/219 |
| 2010/0070139 | A1* | 3/2010 | Ohshima | B60R 1/00 701/42 |
| 2010/0134325 | A1* | 6/2010 | Gomi | B60R 1/00 340/995.14 |
| 2010/0194886 | A1* | 8/2010 | Asari et al. | 348/148 |
| 2010/0201817 | A1* | 8/2010 | Katoh | B60R 1/00 348/148 |
| 2011/0032357 | A1* | 2/2011 | Kitaura | B60R 1/00 348/148 |
| 2011/0115922 | A1 | 5/2011 | Shimizu | |
| 2011/0175752 | A1* | 7/2011 | Augst | B60R 1/00 340/905 |
| 2011/0285574 | A1* | 11/2011 | Tsunekawa | 342/70 |
| 2012/0068840 | A1* | 3/2012 | Ozaki | B60R 1/00 340/456 |
| 2012/0069187 | A1* | 3/2012 | Ozaki | B60R 1/00 348/148 |
| 2013/0033495 | A1* | 2/2013 | Kiyota | E02F 9/261 345/420 |
| 2015/0022664 | A1* | 1/2015 | Pflug | H04N 7/181 348/148 |

FOREIGN PATENT DOCUMENTS

| | | |
|---|---|---|
| EP | 2 192 552 A1 | 6/2010 |
| EP | 2 200 311 A1 | 6/2010 |
| EP | 2 234 399 A1 | 9/2010 |
| EP | 2 285 109 A1 | 2/2011 |

OTHER PUBLICATIONS

European Search Report from corresponding European Application No. 11 16 8355, Oct. 27, 2011.
European Search Report from corresponding European Patent Application No. 11172195.7-2218, Dec. 12, 2011.
Extended European Search Report issued in European Patent Application No. 11162470.6, (7 pgs.), dated Aug. 18, 2011.
European Search Report issued in European patent application No. 11176707.5-1523, 6pp., Dec. 29, 2011.
Chen, Y.Y. et al., "An Embedded System for Vehicle Surrounding Monitoring," 2009 2$^{nd}$ International Conference on Power Electronics and Intelligent Transportation System, *IEEE*, Piscataway, NJ, USA, Dec. 19, 2009, XP031624185, pp. 92-95.
Gandhi, Tarak et al., "Vehicle Surround Capture: Survey of Techniques and a Novel omni-Video-Based Approach for Dynamic Panoramic Surround Maps", *IEEE Transactions on Intelligent Transportation Systems*, 2006, vol. 7, No. 3, XP-002659721, pp. 293-308.
Liu, Y.C. et al., "Bird's-Eye View Vision System for Vehicle Surrounding Monitoring," in Robot Vision, Jan. 1, 2008, Springer Berlin Heidelberg, Berlin, Heidelberg, XP55004046, pp. 207-218.
Tsai, Roger Y., "A Versatile Camera Calibration Technique for High-Accuracy 3D Machine Vision Metrology Using Off-The-Shelf TV Cameras and Lenses", *IEEE Journal of Robotics and Automation*, 1987, vol. 3, No. 4, pp. 323-344.
Tsai, Roger Y., "An Efficient and Accurate Camera Calibration Technique for 3D Machine Vision", *Proceedings of IEEE Conference on Computer Vision and Pattern Recognition*, Miami Beach, FL, 1986, pp. 364-374.
Zhang, Z., "A Flexible New Technique for Camera Calibration", *IEEE Transactions on Pattern Analysis and Machine Intelligence*, 2000, vol. 22, No. 11, pp. 1330-1334.
Perdersini F., et al.,"Accurate and Simple Geometric Calibration of Multi-Camera Systems", Signal Processing, Elsevier Science Publishers B.V. Amsterdam, NL, vol. 77, No. 3, pp. 309-334, Sep. 1, 1999.
Forbes et al., "An Inexpensive, Automatic and Accurate Camera Calibration Method", Proceedings of the Thirteenth Annual South African Workshop on Pattern Recognition, 2002.
Stefan Vacek et al., "Road-Marking Analysis for Autonomous Vehicle Guidance", Online Proceedings of the 3rd European Conference on Mobile Robots, pp. 1-9, Sep. 19, 2007.
Douret J. et al., "A Volumetric Multi-Cameras Method Dedicated to Road Intelligent Vehicles Symposium", 2004 IEEE, pp. 442-446, Parma, Italy Jun. 17-17, 2004, Piscataway, NJ, USA IEEE Jun. 14, 2004.
Kunfeng Wang et al., "Research on Lane-Marking Line Based Camera Calibration", Vehicular Electronics and Safety, 2007, ICVES, IEEE International Conference on, IEEE, Piscataway, NJ, pp. 1-6, Dec. 13, 2007.
European Patent Office, European Examination Report of EP11162470, Oct. 31, 2013, Germany, 5 pages.

\* cited by examiner

VEHICLE SURROUND VIEW SYSTEM

PRIORITY CLAIM

This application claims the benefit of priority from European Patent Application No. 11162470.6, filed Apr. 14, 2011, which is incorporated by reference.

BACKGROUND OF THE INVENTION

1. Technical Field

The invention relates to a surround view system for generating a surround view for a vehicle.

2. Related Art

In recent years, use of rear and side view cameras for vehicles has been proliferating. Often these cameras are used for driver assistance and can improve vehicle safety. Although, these cameras are known to provide views that typical rear and side view mirrors cannot, they too have blind spots that can be hazardous to the driver and others. In addition to blind spots, these cameras can also be hazardous in that the views that they provide often suggest to the driver of vehicle that there is more space between the vehicle and another object than in reality.

SUMMARY

A surround view system provides more dependable views from a vehicle by providing a surround view, e.g., a 360° view, from the vehicle. The surround view system provides this view by way of cameras positioned at various locations of the vehicle. The cameras generate image data corresponding to the surround view, and an image processing device processes the image data; and then, the processing device generates the surround view as a simulated predetermined shape that can be viewed from a display. The simulated predetermined shape, e.g., a simulated bowl, can have a flat bottom with a rectangular shape and a rim with an ellipsoidal shape. Also, the simulated predetermined shape can be an elliptic paraboloid or an elliptic paraboloid with its bottom cut off and distorted, so that it has a flat bottom with a rectangular shape and a rim with a parabolic shape. Furthermore, the surround view system can include a user input device, such as a touchscreen, that facilitates changing a viewing perspective of the surround view. The viewing perspective can be changed by position, direction, and an angle, so that a driver can obtain a desired view or an overview of the vehicle surroundings without turning away from a front end of the vehicle.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The surround view system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
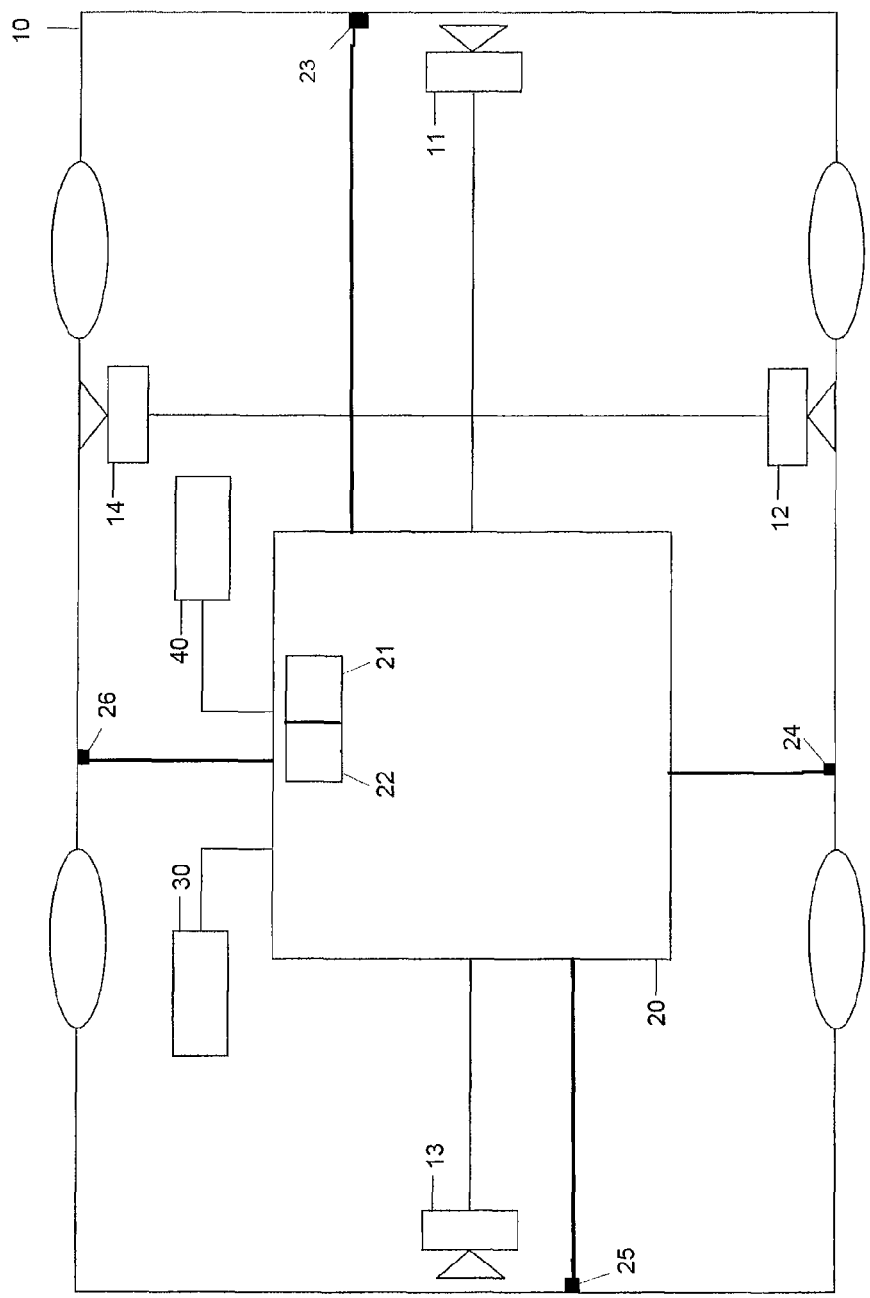
FIG. 1 shows a schematic view of an example surround view system incorporated into a vehicle.

It is to be understood that the following description of examples of implementations are given only for the purpose of illustration and are not to be taken in a limiting sense. The partitioning of examples in function blocks, modules or units shown in the drawings is not to be construed as indicating that these function blocks, modules or units are necessarily implemented as physically separate units. Functional blocks, modules or units shown or described may be implemented as separate units, circuits, chips, functions, modules, or circuit elements. One or more functional blocks or units may also be implemented in a common circuit, chip, circuit element or unit.

Described below is a surround view system that provides more dependable views from a vehicle by providing a surround view, e.g., a 360° view, from the vehicle. The surround view system provides the surround view by way of cameras positioned at various locations of the vehicle. The cameras generate image data corresponding to the surround view, and a processing device, such as an image processing device, processes the image data and then generates the surround view. The processing device also facilitates rendering the surround view to a simulated predetermined shape, e.g., a simulated bowl, which can be viewed from a display. In other examples, the surround view may be rendered in other simulated shapes, such as a sphere, a cylinder, a cuboid, a cone, a pyramid, a series of arcs, or any other predetermined simulated shape capable of providing a surround view.

The simulated predetermined shape can be an elliptic paraboloid or an elliptic paraboloid with its bottom cut off and distorted, so that it has a flat bottom with a rectangular shape and a rim with an ellipsoidal shape. Furthermore, the surround view system can include a user input device, such as a touchscreen, that facilitates changing a viewing perspective of the surround view. The viewing perspective can be changed by its position, direction, and angle, so that a driver can obtain a desired view or an overview of the vehicle surroundings without turning away from a front end of the vehicle. With this functionality, any obstacles situated near the vehicle can be detected easily. Even if these obstacles reside in a typical blind spot.

With respect to the cameras, the surround view system can utilize fisheye cameras having a horizontal opening angle of more than 170°. Also, the cameras can include any image recording device that includes or can be combined with a wide angle lens, such as a fisheye lens. In one example configuration, the surround view system uses four fisheye cameras (e.g., cameras having a fisheye lens) positioned on four external surfaces of the vehicle. A first camera can be mounted on a left external surface of the vehicle, a second camera on a right external surface, a third camera on a left external surface, and a fourth camera on a front external surface. The processing device combines the image data generated by the cameras and generates the surround view. This view can cover the complete surrounds of the vehicle.

The flat bottom of the simulated predetermined shape simulates a surface of the ground. The flat bottom of the simulated predetermined shape can have dimensions proportional to the vehicle's overall length and width. When the dimensions of the flat bottom are proportional to the vehicle's overall length and width, a realistic representation of the surroundings can be obtained. Further, the ellipsoidal rim and ellipsoidal (with the exception of the bottom, as the bottom is flat) cross sections of the simulated predetermined shape can have dimensions proportional to the length and width of the vehicle. Also, cross sections of the simulated predetermined shape can change from top to bottom of the simulated predetermined shape gradually from the ellipsoidal shape of the rim to the rectangular shape of the flat bottom. For example, midway down the simulated predetermined shape a cross section can have a shape of a rectangle with curved corners. These cross sections can change in shape linearly, such that the cross sections convert from an ellipse to a rectangle gradually. Regarding side cross sections of the simulated predetermined shape, these cross sections can have an ellipsoidal shape except for the bottom of the section that is flat. With respect to side and top cross sections of the simulated predetermined shape, each respective cross section can be a gradual varying shape from its neighboring cross sections.

Particularly, the processing device can generate the simulated predetermined shape such that in the cross section at the bottom of the simulated predetermined shape, a width-to-length ratio of the section is between about 0.6 and 0.8. Also, the ratio can be in a range of about 0.65 to 0.75, or a predetermined value, such as 0.7. On the bottom of the simulated predetermined shape, a ratio with respect to ellipsoidal-to-rectangular shape can be with a range of 0% to 2%. Also, this last ratio can be in a range of about 0.5% to 1.5%, or a predetermined value, such as 1%. Further, the bottom can have dimensions greater or smaller than that of the width and length of the vehicle.

Furthermore, the shape of the simulated predetermined shape can be changed. For example, the processing device can change the size of the bottom of the simulated predetermined shape and this change of the bottom may be achieved via the user input device. This can be beneficial in a parking application, where it may be desirable to increase the size of the bottom of the simulated predetermined shape. In a parking situation, it may be helpful that all of the objects located on the ground are displayed at a correct location. In some examples, the objects may be displayed with a little distortion. When an object is located on the ground and when the simulated predetermined shape has a flat bottom, the objects are accurately visualized.

The surround view system can further include a sensor that gathers distance information of objects located in the vehicle's surroundings. The processing device can use the received information to correct a distance of objects shown in the surround view of the vehicle. For example, the surround view system can receive distance information from a 3D sensor such as a photonic mixing device sensor (PMD-sensor). The PMD-sensor can provide distance information of objects located in an image plane of the PMD-sensor. The processing device can then render the objects in the surround view in a location representative of an actual location with respect to the vehicle.

In addition, the processing device can determine distance of an object shown in the surround view without distance information provided by other sensors. For example, the distance of an object shown in the surround view can be determined based on movement of the object with respect to movement of the vehicle. When the vehicle is moving, the surround view and the objects within it are moving generating an optical flow of objects. The greater the distance of an object is to the vehicle, the smaller the velocity of the object is in the surround view. Therefore, based on the velocity of the object, the distance can be estimated, e.g., by comparing the object's velocity to a table containing predefined sets of object velocities and corresponding distances.

In FIG. 1, an example vehicle 10 is illustrated having four cameras 11, 12, 13, and 14. The cameras 11 can include an image recording device with a wide-angle lens, such as a camera with a fisheye lens. The cameras are placed in the perimeter of the vehicle 10 symmetrically in such a way that they cover the complete surrounding perimeter. For example, the side cameras 12 and 14 may be provided in the left and right door mirrors of the vehicle 10. The front and the rear cameras 11 and 13 may be located in different locations of the vehicle 10 depending on the vehicle's type. The vehicle 10 further includes an image processing device 20 that receives image data generated by the cameras 11, 12, 13, and 14. Also, the image process device 20 merges the image data in such a way that a surround view is generated. Further, each of the cameras 11, 12, 13, and 14 can have a fisheye lens or another type of wide-angle lens. These wide-angle lenses can generate distorted images of the surroundings. The image processing device 20 can also combine the images in such a way that a surround view is generated that can be displayed on a display 30. Furthermore, a user input device 40 can be connected to the processing device 20. The user input device 40 can facilitate changing the surround view's position, direction, and angle as displayed on the display 30. With the surround view system a view can be generated of the vehicle's 10 surroundings with respect to a simulated user located somewhere in the vehicle surroundings. For example, one possible position of the simulated user is above the vehicle 10 to generate a bird's eye view, or top view, in which the vehicle surroundings are seen from above the vehicle. The processing device can also contain a first interface 21 that receives signals from the user input device and facilitates communicating such signals to the processing device 20, where the processing device receives detailed information indicating from which position, direction, and angle the surround view is to be generated. The processing device 20 can further include a second interface 22 that can receive signals from sensors 23, 24, 25, and 26, which can be sensors measuring the distance from the vehicle 10 to objects located in the vehicle's surroundings. The set of sensors can include a PMD-sensor, an ultrasound sensor, a radar sensor, and any combination thereof.

Figure 2:
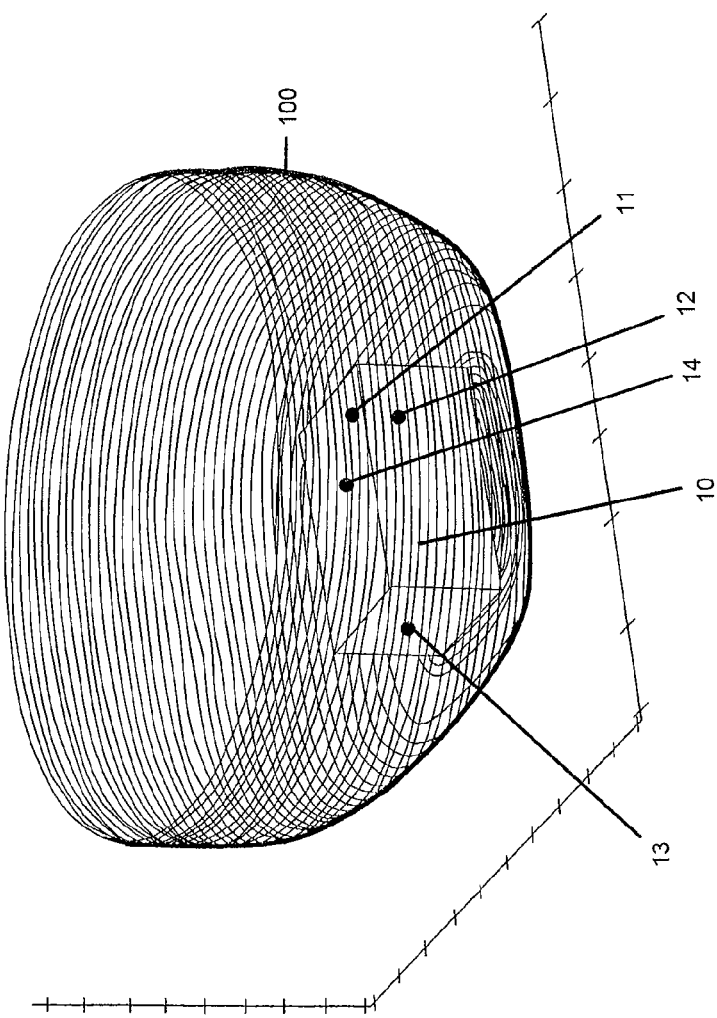
FIG. 2 shows a schematic view of an example simulated predetermined shape that has a flat bottom with a rectangular shape and a rim with an ellipsoidal shape.

In FIG. 2, depicted is a graph illustrating a simulated bowl 100 that has a flat bottom with a rectangular shape and a rim with an ellipsoidal shape. The image data generated by the cameras 11, 12, 13 and 14 can be merged and inversely projected onto the simulated bowl 100 that surrounds the vehicle 10 (depicted by a rectangular box). As illustrated, the vehicle 10 is located on a bottom surface of the simulated bowl 100. The simulated bowl 100 extends out from the vehicle 10 and can be described, for example, by horizontal cross sections and vertical cross sections. The horizontal cross sections have an ellipsoidal shape and a ratio of a major axis to a minor axis is proportional to a ratio of the vehicle's length and width. For example, a top horizontal cross section can have a purely ellipsoidal shape as depicted by a horizontal cross section 110 in FIG. 3. The top horizontal cross section 110, as depicted, has a major axis labeled "a" and a minor axis labeled "b". Shape of the horizontal cross sections of the simulated bowl 100 gradually change, from top to bottom, from an ellipsoidal shape to a curved rectangle as depicted by a horizontal cross section 120 in FIG. 3. As shown in FIG. 2, a bottom horizontal cross section of the simulated bowl 100 has the smallest area of the horizontal cross sections. Points on the simulated bowl 100 located between two cross sections are interpolated using positions of points located on two neighboring cross sections. The smallest horizontal section can have a surface that can have an area less than a horizontal cross section of the vehicle 10. Further, the bottom most horizontal section simulates being on the ground. Also, where the bottom horizontal cross section is a rectangle with curved corners, straight edges of the rectangle can make up 99% of the perimeter of the rectangle (See rectangle with curved corners 120 of FIG. 3). For example, in FIG. 3, curved corner, labeled "e", makes up 0.25% of the perimeter; and straight edges, labeled "c" and "d", make up 49.5% of the perimeter. Towards the top of the simulated bowl 100, curved portions of the perimeter of a horizontal cross section can be approximately 70% of the total perimeter. The following equation can be used in determining the shape of a horizontal cross section of the simulated bowl 100.

$$\frac{\text{curved parts} - \text{straight parts}}{\text{overall length of the cross section}}$$

Figure 3:
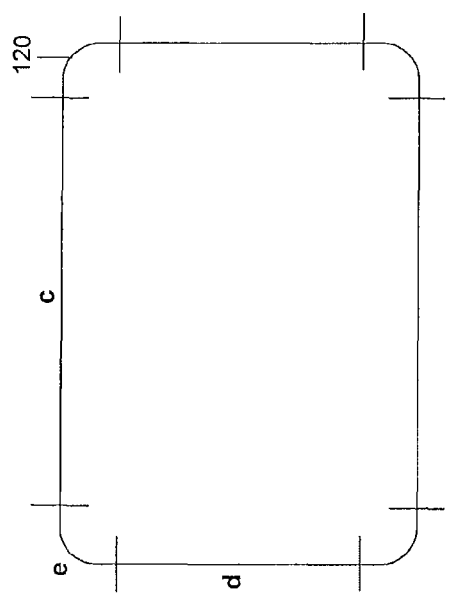
FIG. 3 shows two different cross sections of the simulated predetermined shape shown in FIG. 2.
Figure 3:
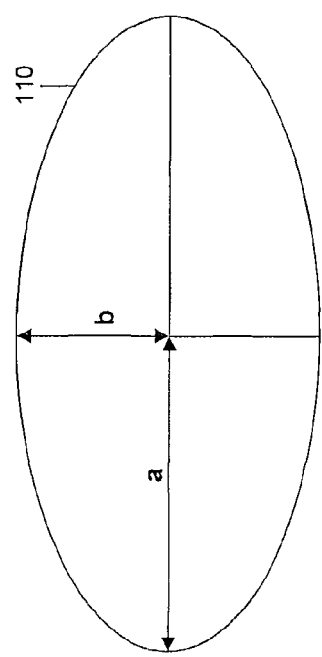

The total length of the curved parts of a horizontal cross section subtracted from the total length of the straight parts, divided by the total length of the perimeter of the horizontal cross section, gives a ratio that determines the shape of the cross section of the simulated bowl 100. When one moves down through parallel horizontal cross sections, the ratio can be linearly reduced until the simulated bowl 100 touches the ground, or the lowest part of the vehicle. While moving down through the cross sections, the ratio can be within a range of about 0.6 to 0.8, within a range of about 0.65 to 0.75, or a predetermined value, such as 0.7. Also, on the bottom of the simulated bowl 100, the ratio can be further linearly reduced to a minimum of 0.01. With reference to FIG. 3, this would mean that the curved corner labeled "e" would only constitute 0.25% of the overall length of the perimeter of the horizontal cross section 120. Also, the area of the bottom of the simulated bowl 100 having the flat surface can be larger than any horizontal cross section of a respective vehicle.

Furthermore, the vertical cross sections of the simulated bowl 100 provide an ellipsoidal shape except on the bottom of middle cross sections, which can be, for example, a straight line. In one example, a derivative of an ellipse at a connection with the straight line is zero and thus corresponds to the derivative of the line at this point. This example simulated bowl 100 allows a smooth connection between curved side surfaces and the ground plane. This smooth connection facilitates generating an accurate visual perception of objects that are projected to a part of the simulated bowl 100 where the simulated bowl touches or is in close proximity to the ground, or a lowest part of the vehicle near a ground plane.

Also, the shape of the horizontal cross sections can change from top to bottom of the simulated bowl 100, from an ellipsoidal shape to a rectangular shape. In this example, two straight edges and the curved corners are replaced by ends of an ellipse. This provides for a shape where there are two straight edges bounded by two ends of an ellipse.

Further, objects located in the vehicle's surroundings located where a portion of the simulated predetermined shape would exist are generated without distortion by the processing device. Points located outside or inside the simulated predetermined shape can be generated and displayed with a distortion. Nevertheless, the shape of the simulated predetermined shape provides a dependable view for the user in that the space between the vehicle and surround objects is accurately displayed. For example, an object cannot appear to be further from the vehicle than it is in reality. On the simulated predetermined shape bottom, objects may be projected on the ground plane. This has the effect of accurately displaying objects on the ground plane. For example, road markings can be accurately projected on the bottom of the simulated predetermined shape. Furthermore, the bottom of the simulated predetermined shape, which is a curved rectangle, matches the form of the vehicle, which is also a rectangle in generation of the simulated predetermined shape. The simulated predetermined shape can have the form of a portion of a sphere or a portion of an ellipsoid. By being a portion of one of these shapes, the simulated predetermined shape can provide for smooth changes in objects moving in the surrounds of the vehicle. Whether these objects appear to be moving because the vehicle is moving, or the objects are actually moving. Furthermore, the ellipsoidal shape of the vertical cross sections provides a smooth junction for visualizations of objects near the bottom of the simulated predetermined shape. Further, a gradient at a connection of the flat bottom with a curved portion of a vertical cross section is between about 80° and 100° or approximately 90°.

Figure 4:
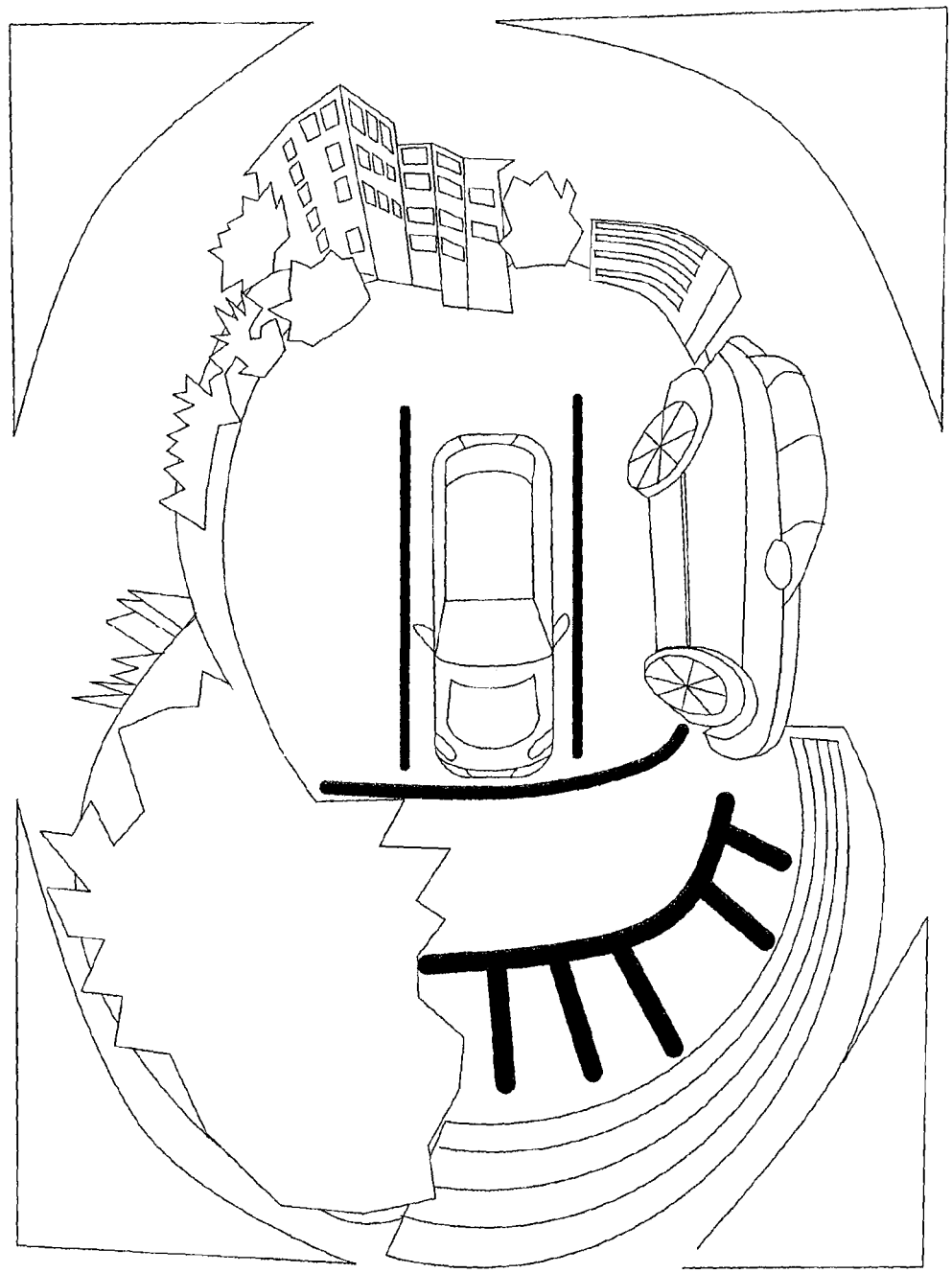
FIG. 4 shows a top view of a vehicle's surroundings generated by the surround view system shown in FIG. 1.
Figure 5:
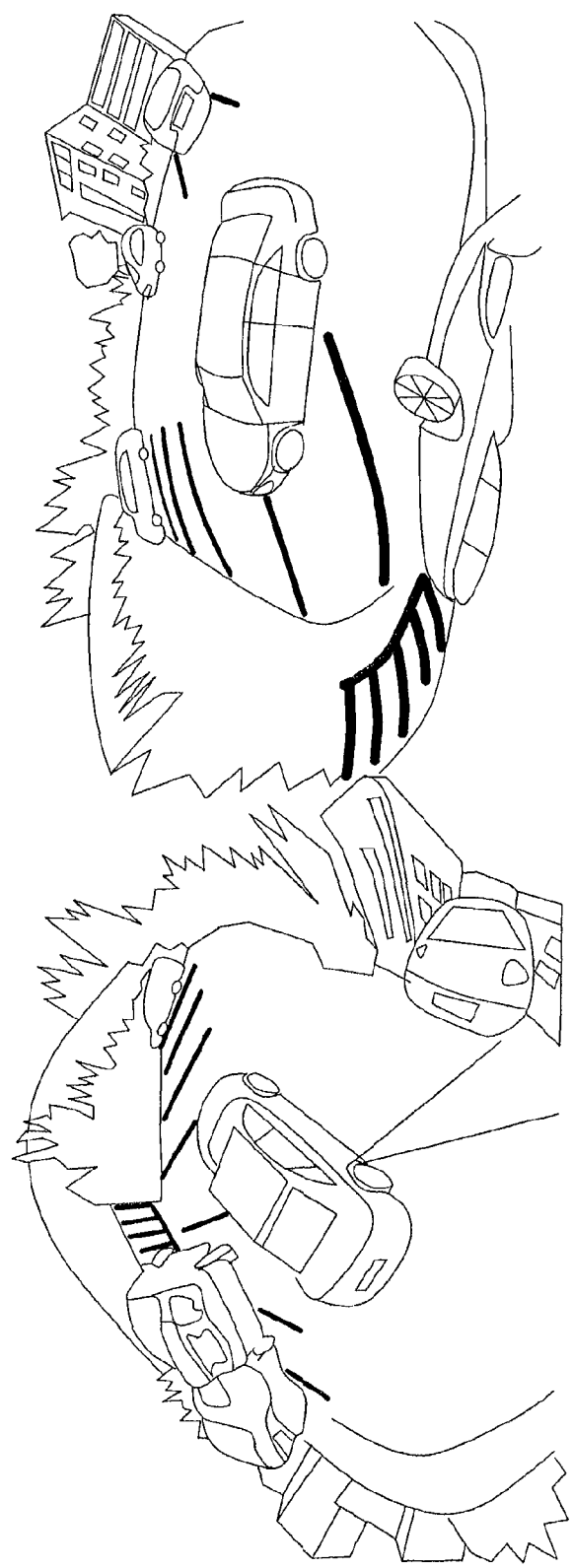
FIG. 5 shows a side perspective view of a vehicle's surroundings generated by the surround view system shown in FIG. 1.

In FIG. 4, depicted is a bird's eye view of an example surround view. As depicted, objects, e.g., lines of a parking lot, located on the ground are depicted and positioned in the surround view without distortion. A user of the surround view system can change the shape of the simulated predetermined shape during use. This will allow the driver to react flexibly to different situations where the surround view is needed. For example, it is possible to make the simulated predetermined shape's bottom larger than the vehicle. In this situation, more pixels are added to the bottom of the simulated predetermined shape, and a greater view of the ground surface surrounding the vehicle will be visible to a user. This is beneficial in situations such as parking, backing out of a driveway, and leaving a parking space in a parking lot.

The surround view can also be applied during driving the vehicle. The driver can observe the lane markings and neighboring objects without the need to rotate his or her head and without the need to look into the side mirrors. The surround view can thus be used to stay in a lane, e.g., a predefined lane, to change lanes, and enter and exit a highway.

Additionally, it is possible to combine additional sensors with the surround view system. These additional sensors could be used to fine tune the simulated predetermined shape, or correct positions and distortions of objects in the simulated predetermined shape to more accurately reflect spatial realities. These additional sensors can include sensors that measure distance, such as radar sensors, PMD-sensors, and ultrasonic sensors.

Also, the surround view system can generate data regarding the motion and optical flow of objects in the surroundings of the vehicle. This data could be used to estimate the distances of the objects in the surroundings. Also, this data can be derived solely from the simulated predetermined shape, so additional sensors are not needed.

Figure 6:
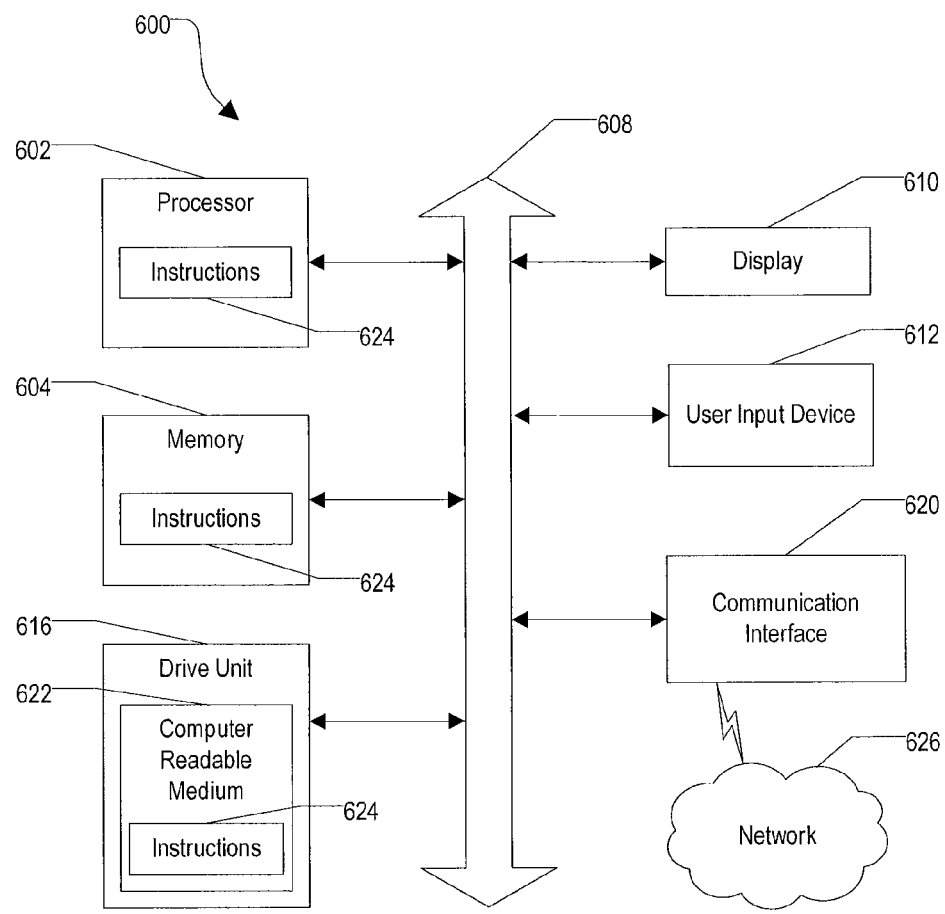
FIG. 6 is a block diagram of an example computer system that may be included or used with a component of the surround view system shown in FIG. 1.

Furthermore, the vehicle 10, the surround view system, one or more of the cameras 11, 12, 13, and 14, the image processing device 20, the display 30, the user input device 40, or any other component of the surround view system may be or may include a portion or all of one or more computing devices of various kinds, such as the computer system 600 in FIG. 6. The computer system 600 may include a set of instructions that can be executed to cause the computer system 600 to perform any one or more of the methods or computer based functions disclosed. The computer system 600 may operate as a standalone device or may be connected, e.g., using a network, to other computer systems or peripheral devices.

In a networked deployment, the computer system 600 may operate in the capacity of a server or as a client user computer in a server-client user network environment, as a peer computer system in a peer-to-peer (or distributed) network environment, or in various other ways. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. The computer system 600 may be implemented using electronic devices that provide voice, audio, video or data communication. While a single computer system 600 is illustrated, the term "system" may include any collection of systems or sub-systems that individually or jointly execute a set, or multiple sets, of instructions to perform one or more computer functions.

The computer system 600 may include a processor 602, such as a central processing unit (CPU), a graphics processing unit (CPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually or programmed.

The term "module" may be defined to include a number of executable modules. The modules may include software, hardware or some combination thereof executable by a processor, such as processor 602. Software modules may include instructions stored in memory, such as memory 604, or another memory device, that may be executable by the processor 602 or other processor. Hardware modules may include various devices, components, circuits, gates, circuit boards, and the like that are executable, directed, and/or controlled for performance by the processor 602.

The computer system 600 may include a memory 604, such as a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 604 includes a cache or random access memory for the processor 602. In alternative examples, the memory 604 may be separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described may be performed by the programmed processor 602 executing the instructions stored in the memory 604. The functions, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

A computer readable medium or machine readable medium may include any non-transitory memory device that includes or stores software for use by or in connection with an instruction executable system, apparatus, or device. The machine readable medium may be an electronic, magnetic, optical, electromagnetic, infrared, or semiconductor system, apparatus, or device. Examples may include a portable magnetic or optical disk, a volatile memory such as Random Access Memory "RAM", a read-only memory "ROM", or an Erasable Programmable Read-Only Memory "EPROM" or Flash memory. A machine readable memory may also include a non-transitory tangible medium upon which software is stored. The software may be electronically stored as an image or in another format (such as through an optical scan), then compiled, or interpreted or otherwise processed.

The computer system 600 may or may not further include a display unit 610, such as a liquid crystal display (LCD), an organic light emitting diode (OLED), a flat panel display, a solid state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive unit 616.

The computer system 600 may include an input device 612 configured to allow a user to interact with any of the components of system 600. The input device 612 may be a number pad, a keyboard, or a cursor control device, such as a mouse, or a joystick, touch screen display, remote control or any other device operative to interact with the computer system 600. A user of the navigation system 100 may, for example, input criteria or conditions to be considered by the navigation device 102 in calculating a route using the input device 612.

The computer system 600 may include a disk or optical drive unit 616. The disk drive unit 616 may include a computer-readable medium 622 in which one or more sets of instructions 624 or software can be embedded. The instructions 624 may embody one or more of the methods or logic described. The instructions 624 may reside completely, or partially, within the memory 604 and/or within the processor 602 during execution by the computer system 600. The memory 604 and the processor 602 also may include computer-readable media as discussed above.

The computer system 600 may include computer-readable medium that includes instructions 624 or receives and executes instructions 624 responsive to a propagated signal so that a device connected to a network 626 can communicate voice, video, audio, images or any other data over the network 626. The instructions 624 may be transmitted or received over the network 626 via a communication port or interface 620, and/or using a bus 608. The communication port or interface 620 may be a part of the processor 602 or may be a separate component. The communication port 620 may be created in software or may be a physical connection in hardware. The communication port 620 may be configured to connect with a network 626, external media, the display 610, or any other components in system 600, or combinations thereof. The connection with the network 626 may be a physical connection, such as a wired Ethernet connection or may be established wirelessly as discussed later. The additional connections with other components of the system 600 may be physical connections or may be established wirelessly. The network 626 may alternatively be directly connected to the bus 608.

The network 626 may include wired networks, wireless networks, Ethernet AVB networks, or combinations thereof. The wireless network may be a cellular telephone network, an 802.11, 802.16, 802.20, 802.1Q or WiMax network. Further, the network 626 may be a public network, such as the Internet, a private network, such as an intranet, or combinations thereof, and may utilize a variety of networking protocols now available or later developed including, but not limited to TCP/IP based networking protocols. One or more components of the navigation system 100 may communicate with each other by or through the network 626.

The term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

The computer-readable medium may include a solid-state memory such as a memory card or other package that houses one or more non-volatile read-only memories. The computer-readable medium may be a random access memory or other volatile re-writable memory. The computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. The computer system 600 may include any one or more of a computer-readable medium or a distribution medium and other equivalents and successor media, in which data or instructions may be stored.

In alternative examples, dedicated hardware implementations, such as application specific integrated circuits, programmable logic arrays and other hardware devices, may be constructed to implement various parts of the system. Applications that may include the apparatus and systems can broadly include a variety of electronic and computer systems. One or more examples described may implement functions using two or more specific interconnected hardware modules or devices with related control and data signals that can be communicated between and through the modules, or as portions of an application-specific integrated circuit. The computer system 600 encompasses software, firmware, and hardware implementations.

The system described may be implemented by software programs executable by a computer system. Implementations can include distributed processing, component/object distributed processing, and parallel processing. Alternatively, virtual computer system processing can be constructed to implement various parts of the system.

The system is not limited to operation with any particular standards and protocols. For example, standards for Internet and other packet switched network transmission (e.g., TCP/IP, UDP/IP, HTML, HTTP) may be used. Replacement standards and protocols having the same or similar functions as those disclosed may also or alternatively be used.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A surround view system comprising:
a plurality of cameras positionable at different locations on a vehicle, the cameras configured to generate image data of surroundings of the vehicle;
an interface configured to receive signals from additional sensors that measure distance from the vehicle to objects located around the vehicle;
a processing device configured to merge the image data from the plurality of cameras, the processing device being further configured to generate a surround view of the vehicle based on the merged image data, where the processing device is configured to project the merged image data on a simulated predetermined shape surrounding the vehicle, the simulated predetermined shape having a flat bottom, the flat bottom having an outer perimeter with straight sections and curved sections, the simulated predetermined shape continuing above the bottom in horizontal cross sections, a top cross section of the simulated predetermined shape being elliptic in shape and having a major axis that is longer than a minor axis, the simulated predetermined shape being a bowl, and a shape of the bowl changing from a top of the bowl to a bottom of the bowl gradually from cross sections of the bowl having an elliptic shape with a major axis that is longer than a minor axis to cross sections of the bowl having a rectangular shape with curved corners, the processing device configured to selectively change a size of the flat bottom of the simulated predetermined shape based on a user input requesting the change; and a display configured to display the surround view;

wherein a ratio of a length of the curved segments of the bottom cross section to a total length of a perimeter of the bottom cross section is between 0.6 and 0.8.

2. The surround view system according to claim 1, further comprising a user input device configured to change a viewing perspective of the surround view, and wherein a ratio of a length of the curved sections of the outer perimeter of the flat bottom to a total length of the outer perimeter of the flat bottom is 0.01.

3. The surround view system according to claim 1, where a ratio of a long edge to a short edge of the rectangular shape is proportional to a ratio of a length of the vehicle to a width of the vehicle, and wherein the rectangular shape with curved corners comprises straight segments and curved segments.

4. The surround view system according to claim 3, where a ratio of the major axis to the minor axis of the elliptic shape is proportional to a ratio of the length of the vehicle to the width of the vehicle, and wherein a bottom cross section of the horizontal cross sections has the rectangular shape with curved corners.

5. The surround view system according to claim 4, where an angle at a junction of the flat bottom with a curved portion of vertical sections of the simulated predetermined shape is approximately 90°, and wherein the bottom cross section touches the flat bottom.

6. The surround view system according to claim 1, where the user input requesting the change in the size of the flat bottom of the simulated predetermined shape comprises input received via a user input device, and where the processing device is configured to change the size of the flat bottom of the simulated predetermined shape during use responsive to the input received via the user input device.

7. The surround view system according to claim 6, wherein the processing device is configured to change the size of the flat bottom of the simulated predetermined shape by adding pixels to the flat bottom of the simulated predetermined shape responsive to the input received via the user input device, wherein, after adding the pixels, the flat bottom of the simulated predetermined shape has one or more of a greater length than a length of the vehicle and a greater width than a width of the vehicle.

8. The surround view system according to claim 7, where the processing device is further configured to determine a distance of an object shown in the surround view with respect to motion of at least one of the object or the vehicle, and where the processing device is further configured to fine tune the simulated predetermined shape or correct positions and distortions of the object in the simulated predetermined shape based on the distance.

9. The surround view system according to claim 7, where the cameras are wide-angle cameras having a horizontal opening angle of more than 170°.

10. A method for generating a surround view of a vehicle, the method comprising:

providing a plurality of image sensors at different locations on the vehicle;

the image sensors generating image data of surroundings of the vehicle that cover the surroundings of the vehicle;

receiving signals from additional sensors that measure distance from the vehicle to objects located around the vehicle;

processing the image data of the image sensors to generate the surround view of the vehicle based on the image data from the image sensors, where the image data are inversely projected on a predetermined shape surrounding the vehicle, the predetermined shape having a flat bottom, the predetermined shape continuing above the flat bottom with horizontal shapes, a top shape of the predetermined shape being ellipsoidal in shape and having a major axis that is longer than a minor axis, the predetermined shape being a bowl, and a shape of the bowl changing from a top of the bowl to a bottom of the bowl gradually from cross sections of the bowl having an elliptic shape with a major axis that is longer than a minor axis at a top rim of the bowl to cross sections of the bowl having a rectangular shape with curved corners, where processing the image data includes selectively changing a size of the flat bottom of the predetermined shape responsive to user input requesting the change in size received from a user input device, wherein a bottom shape of the horizontal shapes is a rectangular shape with curved corners comprising straight segments and curved segments, the curved segments comprising the curved corners, wherein the bottom shape touches the flat bottom, and wherein a ratio of a length of the curved segments to a total length of an outer perimeter of the bottom shape is between 0.6 and 0.8; and displaying the generated surround view.

11. The method according to claim 10, further comprising:

changing a position and an angle of view with which the generated surround view is displayed in accordance with a user input, wherein the flat bottom has a perimeter with straight sections and curved sections, and wherein a ratio of a length of the curved sections of a perimeter of the flat bottom to a total length of the perimeter of the flat bottom is 0.01.

12. A surround view system comprising:

a processing device configured to process image data corresponding to surroundings of a vehicle, the processing device being further configured to generate a surround view based on the image data, where the processing device is further configured to project the image data on a simulated predetermined shape surrounding the vehicle, the simulated predetermined shape having a flat bottom, the simulated predetermined shape configured to continue above the flat bottom in horizontal cross sections, the simulated predetermined shape having a top cross section being elliptic in shape and having a major axis that is longer than a minor axis, the simulated predetermined shape being a bowl, and a shape of the bowl changing from a top of the bowl to a bottom of the bowl gradually from cross sections of the bowl having an elliptic shape with a major axis that is longer than a minor axis at the top of the bowl to cross sections of the bowl having a rectangular shape with curved corners at the bottom of the bowl, the processing device configured to selectively change a size of the flat bottom of the simulated predetermined shape based on user input requesting the change in the size of the flat bottom; and an interface configured to receive signals from additional sensors, other than sensors capturing the image data, that measure distance from the vehicle to objects located around the vehicle;

wherein a bottom cross section of the horizontal cross sections comprises four straight edges and four curved corners, and wherein a ratio of a length of the four curved corners to a total length of the four curved corners and the four straight edges is between 0.6 and 0.8, and wherein the edges and corners lie on an outer perimeter of the bottom cross section, where the flat bottom meets a wall of the simulated predetermined shape.

13. The surround view system according to claim 12, further comprising a display configured to display the surround view, and where the processing device is further configured to correct positions and distortions of an object in the simulated predetermined shape based on a measured distance of the object shown in the surround view with respect to motion of at least one of the object or the vehicle.

14. The surround view system according to claim 12, where a ratio of a long edge to a short edge of the rectangular shape is proportional to a ratio of a length of the vehicle to a width of the vehicle, and wherein the bottom cross section touches the flat bottom.

15. The surround view system according to claim 12, where a ratio of the major axis to the minor axis of the elliptic shape is proportional to a ratio of a length of the vehicle to a width of the vehicle, wherein the flat bottom has a perimeter with straight sections and curved sections, and wherein a ratio of a length of the curved sections to a total length of the perimeter of the flat bottom is 0.01.

16. The surround view system according to claim 12, where the surround view is a 360° view, and wherein the processing device is configured to change the size of the flat bottom of the simulated predetermined shape during use by adding pixels to the flat bottom of the simulated predetermined shape responsive to the user input requesting the change in the size of the flat bottom.

* * * * *